May 12, 1970 J. R. A. BEALE 3,512,055

SEMI-CONDUCTOR DEVICES AND METHOD OF MAKING

Filed Aug. 6, 1957

INVENTOR
J.R.A BEALE
BY Frank R. Jifani
AGENT

United States Patent Office 3,512,055
Patented May 12, 1970

3,512,055
SEMI-CONDUCTOR DEVICES AND METHOD OF MAKING

Julian Robert Anthony Beale, Wraysbury, near Staines, England, assignor, by mesne assignments, to U.S. Philips Corporation, New York, N.Y., a corporation of Delaware Filed Aug. 6, 1957, Ser. No. 676,563
Claims priority, application Great Britain, Aug. 10, 1956, 24,559/56
Int. Cl. H01l 3/00
U.S. Cl. 317—235 27 Claims The invention relates to a method of manufacturing a semi-conductive blocking-layer system or device, wherein in a semi-conductive body by diffusion of one or more active or doping impurities of one type or carrier characteristic a zone of this type is formed, on which zone a rectifying electrode is provided by alloying a quantity of electrode material containing one or more active or doping impurities of the other type or opposite carrier characteristic. It refers particularly to the manufacture of a transistor, wherein in a semi-conductive body, by diffusion, a bases zone is formed, to which is applied, by alloying, an emitter electrode. The invention relates furthermore to semi-conductive blocking layer systems or devices, particularly transistors manufactured by carrying out the method according to the invention. It relates finally also to a semi-conductive blocking-layer system, particularly a transistor comprising a semi-conductive body with an alloy electrode, particularly an emitter electrode, which is applied to a diffused zone provided with an ohmic contact, particularly a base zone provided with a base contact of a transistor, the electrode being separated from the remaining part of the body by this diffused zone.

It is known to manufacture semi-conductive blocking-layer systems, particularly transistors, by providing in a semi-conductive body first a surface layer of opposite conductivity type by means of diffusion and then, in a separate process, by applying to and into this surface layer a rectifying electrode by means of alloying, the penetration depth of the alloy electrode being smaller than the penetration depth of the diffusion layer. It is thus possible to supply an extremely thin intermediate layer of opposite conductivity type in a semi-conductive body. Therefore, this process is particularly used for the manufacture of high-frequency transistors, wherein an extremely thin base is desired between the emitter electrode and the collector electrode.

This known method has, however, inter alia, the disadvantage that the accuracy with which the thickness of the intermediate layer can be manufactured depends not only upon the tolerance of the diffusion process but also upon the tolerance of the alloying process, since the thickness varies with the difference between the penetration depth of the diffusion layer and the penetration depth of the alloy electrode, which elements penetrate into the crystal from the initial crystal surface. This affects adversely, in particular, semi-conductive blocking-layer systems, in which the thickness of the intermediate layer is very small and, moreover, constitutes a critical magnitude for the operation of the blocking-layer system, as is the case for example with transistors, particularly high-frequency transistors, wherein the thickness of the base zone below the emitter electrode is a magnitude which affects to a large extent inter-alia the frequency response of the transistors.

The invention has for its object inter alia to provide different methods of manufacturing a blocking layer system, wherein diffusion and alloying are employed, but by which a higher degree of reproduceability can be attained with respect to the thickness of the intermediate layer. It has furthermore for its object to provide a method of manufacturing a transistor, by which the desired thickness of the base zone can be attained by means of diffusion with a greater degree of accuracy and in a simple manner.

With the manufacture of a semi-conductive blocking-layer system, in which in a semi-conductive body, by diffusion of one or more active impurities of one type a zone of this type is formed, to which zone is applied, by melting down a quantity of electrode material containing one or more impurities of the other or opposite type, a rectifying alloy electrode, the said zone is formed, in accordance with the invention, during the application of the alloy electrode by diffusion out of the formed melt via the liquid-solid interface. This method is particularly advantageous for the manufacture of semi-conductive blocking-layer systems, in which the thickness of the diffusion zone is very important. It has been found to be particularly suitable and it is preferably employed for the manufacture of transistors, in which, in accordance with the invention, during the melting down of the emitter electrode, by diffusion, from the formed emitter electrode melt, via the liquid-solid interface, the base zone is diffused into the semi-conductive body.

It may be evident without the need for further explanation that the active impurity or impurities of one type used for the formation of the diffused layer must have a materially higher diffusion velocity in the semi-conductive body than the active impurities of the other type, employed for the formation of the recrystallized alloy electrode on the diffused layer. Moreover, as a matter of course, the quantity of active impurity of one type in the melt and/or the segregation constant or coefficient of this impurity with respect to the semi-conductive body must be chosen to be so small with reference to the active impurity of the other type that during the solidification of the melt a layer of a conductivity type opposite that of the diffused layer grows on this layer, on which the metallic part of the electrode solidifies, so that, indeed, a rectifying electrode is obtained on the diffused layer.

An active impurity of said one type can be supplied during the alloying to an adequate quantity from the ambience to the electrode melt, from where it diffuses into the body. In this case the electrode material does not contain active impurity of one type prior to alloying. Moreover, to the electrode material, which will thus serve as a carrier, can be supplied, prior to alloying, an adequate quantity of active impurity of said one type, which can penetrate during the alloying operation from the liquid phase directly into the semi-conductive body and so produce the diffused zone as an alternative, within the scope of the invention, these methods may be combined, wherein the active impurity of one type is supplied, from the liquid phase, partly from the ambience and partly from the electrode material itself. The quantity of electrode material may, for example, be formed in the shape of a pellet or globule and may, as an alternative, be applied in the form of a layer, for example by spraying or electrolytic deposition.

In general, the method according to the invention provides a thin intermediate layer, with which an ohmic connection can be established only with difficulty. For example a transistor requires an ohmic connection to the base zone, a so-called base contact. According to a further aspect of the invention a surface is formed during the alloying and diffusing of the zone below the melt, by diffusion of active impurities of said one type from the ambient atmosphere simultaneously into a body surface adjacent the melt, this surface layer being of the same type as the said zone and being contiguous with said zone. To this surface layer may then be secured an ohmic connection, which constitutes at the same time an ohmic connection with the diffusion zone. A further possibility resides in that first, at least in part of the surface, a layer of one conductivity type is formed, after which the quantity of electrode material is alloyed to part of this layer, while via the liquid solid interface the said zone is diffused into the body, in a manner such that the maximum penetration depth of the said zone into the semi-conductive body exceeds the penetration depth of the surface layer into the body. This may be achieved in a particularly simple manner by choosing, during the alloying operation, the maximum alloy depth, in other words the depth of the liquid-solid interface into the body to exceed the penetration depth of the said surface layer.

Alloying through the surface layer can be controlled by the choice of the electrode material, particularly of its solubility in the semi-conductor, and the alloying temperature, since at an increase in the alloying temperature, as a rule, also the penetration depth of the melt increases. In the surface layer obtained can then be provided the desired ohmic connection. If the second method is used, wherein first a surface layer of one conductivity type is separately formed, the ambient atmosphere during the alloying process need not contain active impurity, if the electrode material contains, in addition, an adequate quantity of impurity of one type. The ambient atmosphere may then be formed for example by hydrogen.

The alloying may be carried out in two steps, the temperature of the first step exceeding that of the second step. In this manner the diffusion can be carried out in two steps, so that the position of the junction between the melt and the semi-conductor body can be kept more constant, when the junction is at a maximum distance from the crystal.

For the semi-conductor body use may be made of any known semi-conductor, for example germanium or silicon. The semi-conductive body may, as a whole, have one conductivity type opposite that of the diffused layer to be applied, or it may be made partly of intrinsic material. Satisfactory results are obtained by means of a p-type germanium body, the active impurity of one type being constituted by antimony or arsenic, whereas the electrode material may contain indium. Preferably a small quantity of gallium is added to the indium, for example 1% by weight, the gallium having a higher segregation constant with respect to germanium.

With diffusion of antimony and alloying of electrode material constituted by indium-gallium or antimony-indium-gallium, heating may be carried out in a suitable manner at about 700° C. for about 20 minutes. If heating is performed in two steps, a temperature of about 710° for about 10 minutes and a subsequent heating to about 700° C. for about 15 minutes have been found to be suitable.

The semi-conductor blocking-layer system which can be obtained in a simple manner by using one of the aforesaid methods is characterized by a quite new configuration which is particularly suitable for many uses. With such a semi-conductive blocking-layer system according to the invention, which comprises a semi-conductor body with an alloy electrode, which constitutes a rectifying contact with a diffused zone connected to an ohmic contact and separated from the body by this diffused zone, the diffused zone below the said alloy.

Electrode penetrates to a greater depth into the body than in the rest of the body, the diffused zone surrounding the alloy electrode at the surface. A transistor according to the invention comprising a semi-conductive body with an alloy emitter electrode, which is applied to a diffused base zone having a base contact, is characterized in that below the emitter electrode the diffused base zone has penetrated to a greater depth into the body than into the rest of the body and surrounds the emitter electrode at the surface of the body.

The invention will now be described more fully with reference to a few diagrammatical figures and embodiments.

EXAMPLE 1

Figure 1:
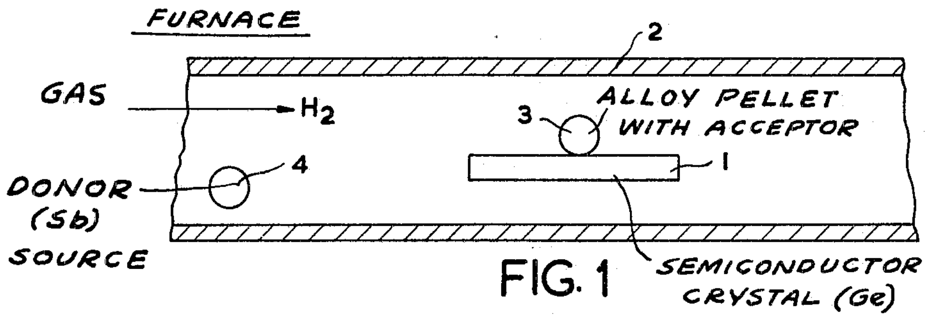
FIG. 1 shows diagrammatically, partly in a sectional view, a furnace in which a method according to the invention can be carried out.
Figure 2:
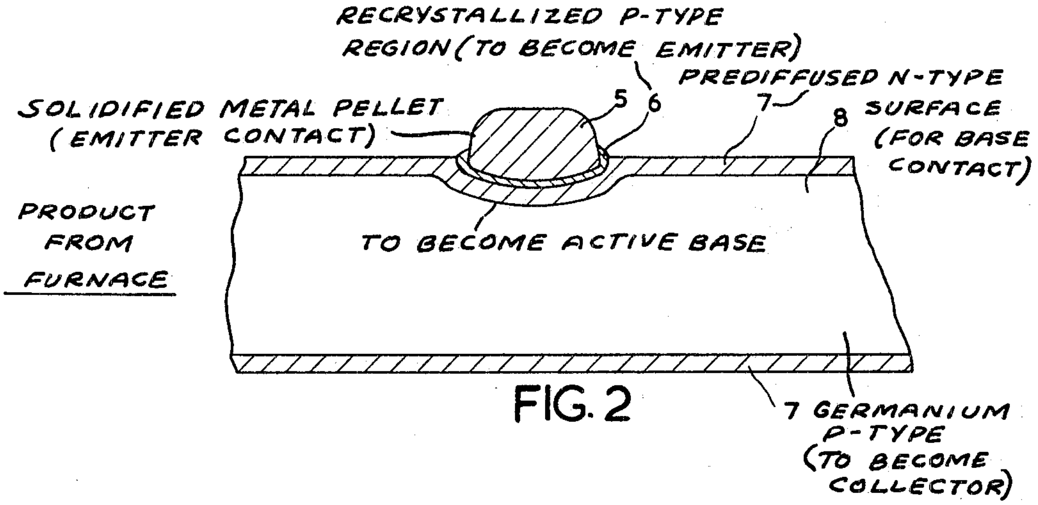
FIG. 2 shows, in a sectional view, a transistor according to the invention immediately after a method according to the invention has been carried out.

A pellet or blank 1 (see FIG. 1) of single-crystal p-type germanium with a resistivity of 1 ohm/cm. and a thickness of about 125$\mu$ is introduced into a tubular furnace chamber 2, which has a diameter of about 3.75 cms. A globule 3 of 99% by weight of indium and 1% by weight of gallium, having a diameter of about 375$\mu$, is placed on the pellet 1. The furnace contains, moreover, a quantity of antimony trichloride 4. Through the furnace chamber 2 is passed, with a speed of about 135 litres per hour, a flow of hydrogen. The pellet 1 and the supply 4 are held in boats, which are not shown in the figure. The supply 4 is heated at a temperature of about 50° C. and in the part of the furnace chamber 2 in which the pellet 1 is contained a temperature of about 700° C. is maintained. The pellet 1 is thus heated at about 700° C. for 20 minutes. The supply 4 heated in the hydrogen flow supplies an antimony-containing ambient atmosphere for the pellet 1 and from this ambient atmosphere antimony diffuses into the surface of the pellet 1. At the same time a melt is formed on and in the pellet 1, which contains the electrode material originating from the globule 3 and the germanium dissolved therein. The antimony diffuses through this melt and the liquid-solid interface between the melt and the semi-conductive body into the semi-conductive body, so that below the melt the diffusion depth of the antimony is determined with reference to the final position of the said interface. Although the melt, apart from the acceptors indium and gallium, contains also the donor antimony, a layer of p-type germanium recrystallizes, upon cooling, on the diffused n-type zone since particularly owing to the fact that gallium has a higher segregation constant than antimony, the acceptors gallium and indium neutralize the donor effect of antimony and largely overcompensate it. Since antimony has a much higher diffusion speed into germanium than gallium or indium, an n-type diffusion layer is formed during the alloying process, below the melt, in which layer the antimony predominates materially. As is shown in FIG. 2, the diffusion layer 7 below the alloy electrode 5, 6 has penetrated more deeply into the body than in the rest of the body, since diffusion into the solid substance is slower than into the liquid phase. The layer 6 constitutes the recrystallized p-type germanium layer, which is rich in gallium and indium, whereas 5 designates the metal part containing mainly indium and gallium of the electrode 5, 6. The interior 8 of the body is not affected by this process and is constituted as before by p-type germanium of about 1 ohm/cm. The greater penetration of the diffusion layer 7 below the electrode 5, 6 is characteristic of semi-conductive blocking-layer systems according to the invention. With the known prior art method described above the penetration depth is substantially the same at all areas.

Figure 3:
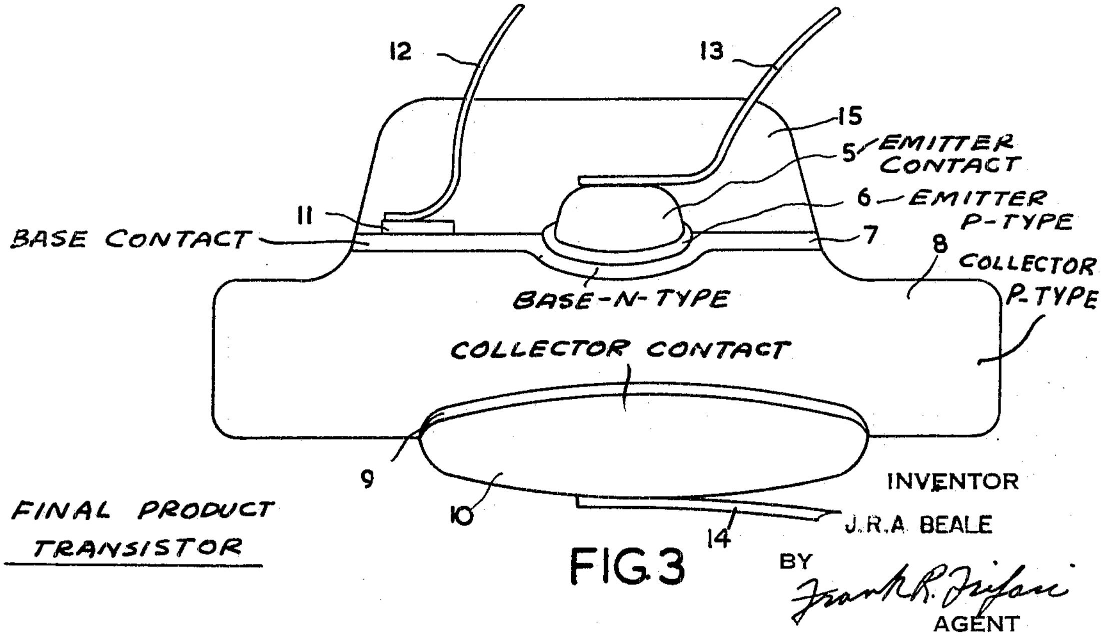
FIG. 3 shows diagrammatically, in a cross sectional view, a transistor according to the invention (shadow shading has been omitted for the sake of clarity).

From the configuration shown in FIG. 2 a p-n-p-transistor as shown in FIG. 3 can be manufactured. An indium globule 10 is placed on that side of the pellet 1, which lies opposite the electrode 5, 6. Thus a recrystallized indium-containing layer 9 is obtained, which contains p-type germanium and to this layer is deposited the metal part 10 which contains mainly indium. The alloying may take place, for example, by heating the assembly at about 450° C. for six minutes in a hydrogen atmosphere. Prior to the alloying process this side was provided with an n-type germanium layer. However, during the alloying, this is dissolved in the liquid phase and during recrystallization the antimony, which is contained in the melt for a very small quantity, is readily overcompensated by the indium, so that an ohmic connection to the interior 8 of the body is established by the electrode 9, 10. By electrolytic deposition a nickel base contact 11 is applied to the base zone 7, which constitutes an ohmic contact to the base zone below the electrode 5, 6. To the metallic parts 11, 5 and 10 are soldered the supply conductors 12, 13 and 14 respectively. A masking lacquer layer 15 is applied to the electrode 5, 6 and the adjacent part of the base zone with the base contact 11, as is indicated in FIG. 3, and then the unmasked part of the diffusion layer 7 is etched off. In this manner a transistor according to the invention is obtained, of which transistor the parts 5, 6 designate the emitter electrode 7, the base zone with the base contact 11, while the collector is constituted by the p-type zone 8 with the ohmic electrode 9, 10 applied thereto. As a consequence of the etching step, the emitter 6 and base zones 7 appear in a pedestal region of the original wafer, as will be clear from FIG. 3 of the drawing.

It will be obvious without the need for further explanation that other known techniques may be used for finishing the transistors after having carried out the diffusion-alloy process. For example, each unwanted part of the diffusion layer 7 may be etched away prior to the post-etching operation, the layer 7 on the lower side of the semi-conductive body (see FIG. 2) may be removed prior to the application of the electrode 9, 10. The ohmic contact 11 may, for example, be replaced by an alloy contact of indium with an adequate supply of arsenic or antimony, in which case this alloy contact can be alloyed to a greater depth in the semi-conductive body than the penetration depth of the diffusion layer.

EXAMPLE 2

The method applied is the same as described in Example 1, the difference being, however, that the alloying takes place in two steps i.e. first for 10 minutes at 710° C. and then for 15 minutes at 700° C. At the highest temperature the melt penetrates more deeply into the pellet 1. At the reduction in temperature in the interphase a small supply of gallium, indium and antimony-containing germanium recrystallizes, which is of the p-conductivity type, particularly owing to the high segregation constant of gallium into germanium, owing to which the acceptors gallium and indium overcompensate the donor effect of the antimony and thus produce a p-type layer. The antimony, however, diffuses more rapidly from the recrystallized layer than the indium or gallium and thus forms the n-type diffusion layer below the p-type layer during the second heating at 700° C. This two-step process has the advantage that small displacements of the junction layer between the melt and the semi-conductive body have a negligible effect during the heating at 700° C. on the thickness of the final n-type diffusion layer.

EXAMPLE 3

The method is performed as indicated in Example 1 or 2, with the difference that the indium globule 3 contains, apart from 1% by weight of gallium, 0.2% of antimony.

EXAMPLE 4

The method described in Example 3 is carried out, with the difference that to the wafer 1, by diffusion, is previously applied a 2$\mu$ n-type surface layer, on part of which the globule 3 is then melted and that the combined diffusion-alloying process is not carried out in an antimony-containing atmosphere, but in an atmosphere of pure hydrogen. The melt must furthermore penetrate more deeply into the semi-conductive body than the penetration depth of the diffusion layer already provided in a thickness of 2$\mu$, so that the thickness of the zone to be diffused is determined by the penetration depth of the antimony with reference to the solid-liquid interface between the melt and the semi-conductive body. The junction layer may penetrate into the body to for example twice the diffusion depth.

What is claimed is:

1. A method of manufacturing a transistor containing an emitter junction adjacent a base zone of predetermined thickness, comprising fusing and alloying to a semi-conductive body a first-conductivity-type-producing-impurity-bearing material in the presence of a gaseous atmosphere containing a second-opposite-type-conductivity-producing-impurity under conditions at which the second impurity simultaneously diffuses into the body via the liquid-solid interface of the fusing material and body to form the base zone of predetermined thickness with the opposite type of conductivity and to form a surface layer of said opposite type of conductivity contiguous with the base zone but of lesser depth than the latter, cooling the body and impurity-bearing material to form a recrystallized emitter zone of a conductivity type determined by the first impurity and forming a p-n junction with the base zone of predetermined thickness, said second impurity possessing a higher diffusion velocity in the semi-conductive body than the first impurity but a lower segregation coefficient than the latter, and making an ohmic contact to the said surface layer to form the base contact of the transistor.

2. A method as set forth in claim 1 wherein portions of the said surface layer and body are removed to locate the base zone in a raised area of the body.

3. A method of manufacturing a semi-conductive body containing a p-n junction adjacent a semi-conductive zone of predetermined thickness, comprising fusing and alloying to a semi-conductive body a first-conductivity-type-producing-impurity-bearing material in the presence of a gaseous atmosphere containing a second-opposite-type-conductivity-producing-impurity under conditions at which the second impurity simultaneously diffuses into the body via the liquid-solid interface of the fusing material and body to form the zone of predetermined thickness with the opposite type of conductivity, and cooling the body and impurity-bearing material to form a recrystallized zone of a conductivity type determined by the first impurity and forming a p-n junction with the zone of predetermined thickness, said first impurity possessing a lower diffusion velocity in the semi-conductive body than the second impurity but a higher segregation coefficient than the latter.

4. A method as set forth in claim 3 wherein the remainder of said body is exposed to the second-impurity-containing gaseous atmosphere thereby to establish a surface layer of the same conductivity type as the zone of predetermined thickness and contiguous with the latter.

5. A method of manufacturing a transistor containing an emitter junction adjacent a base zone of predetermined thickness, comprising fusing and alloying to a semi-conductive body an electrode-forming material containing a first-conductivity-type-producing-impurity and a second-opposite-type-conductivity-producing-impurity in the presence of an atmosphere containing said second impurity and under conditions at which the first impurity possesses a lower diffusion velocity in the semi-conductive body than the second impurity but a higher segregation coefficient than the latter whereby a surface layer of said opposite conductivity type is formed and the second impurity diffuses into the body via the liquid-solid interface of the fusing material and body to form the base zone of predetermined thickness with the opposite type of conductivity and contiguous with the surface layer, cooling the body and impurity-bearing material to form a recrystallized zone of a conductivity type determined by the first impurity and forming a p–n emitter junction with the zone of predetermined thickness, and making contact to the said surface layer to constitute the base connection of the transistor.

6. A method as set forth in claim 5 wherein the fusing and alloying operation is carried out at two different temperature levels in successive steps, with the second temperature level being lower than the first.

7. A method as set forth in claim 5 wherein the conditions are such that the liquid-solid interface is formed at a depth within the body below that of the surface layer, and portions of the body and surface layer are removed to locate the base zone in a raised area of the body.

8. A method of manufacturing a transistor containing an emitter junction adjacent a base zone of predetermined thickness, comprising forming on a semi-conductive body of p-type conductivity by diffusion a surface layer of n-type conductivity, thereafter fusing and alloying at said surface layer an electrode-forming material containing arsenic as an n-type-conductivity-producing-impurity and a p-type-conductivity-producing-impurity under conditions at which the n-type-producing impurity possesses a higher diffusion velocity in the semi-conductive body than the p-type-producing impurity but a lower segregation coefficient than the latter whereby the n-type-producing impurity diffuses into the body via the liquid-solid interface of the fusing material and body to form the base zone of predetermined thickness of n-type conductivity, cooling said liquid-solid interface having a depth within the body exceeding the depth of the surface layer, the body and impurity-bearing material to form a recrystallized zone of p-type conductivity and forming a p-n emitter junction with the base zone of predetermined thickness, and applying an ohmic contact of the n-type surface layer to constitute a base connection.

9. A method of manufacturing a transistor containing an emitter junction adjacent a base zone of predetermined thickness, comprising fusing and alloying to the surface of a semi-conductive body of germanium an electrode-forming material containing a first-conductivity-type-producing-impurity and arsenic as a second-opposite-type-conductivity-producing-impurity in the presence of an atmosphere containing said second impurity and under conditions at which the first impurity possesses a lower diffusion velocity in the semi-conductive body than the second impurity but a higher segregation coefficient than the latter and for a predetermined time interval whereby a surface layer of said opposite conductivity type is formed and the second impurity diffuses into the body via the liquid-solid interface of the fusing material and body to form the base zone of predetermined thickness with the opposite type of conductivity but the same as the surface layer and contiguous therewith and at a depth below that of the surface layer, cooling the body and impurity-bearing material to form a recrystallized emitter zone of a conductivity type dominated by the first impurity and forming a p-n emitted junction with the base zone of predetermined thickness, applying contacts to the emitter zone, anoher zone of the body and to the surface layer to form respectively emitter, collector and base contacts, and removing by etching portions of the diffused surface layer and body to locate the emitter and base zones and surface layer in a raised area of the body.

10. A transistor comprising a semi-conductive body comprising a raised pedestal region containing a diffused surface layer of one conductivity type material and serving as a base region, an alloy electrode fused to said body at said diffused layer forming a recrystallized emitter region and an emitter junction with said base region, said diffused base layer having a depressed portion of predetermined thickness underlying the alloy emitter electrode but contiguous with the remainder of said layer and surrounding said alloy electrode, and an ohmic base contact to an exposed portion of said diffused layer and on the pedestal region and spaced from said emitter electrode, said diffused surface layer containing a first conductivity-determining impurity, said emitter region containing said first impurity and also a second impurity producing the opposite conductivity type material and determining the conductivity type of said emitter region, said first impurity possessing a greater diffusion velocity in said semi-conductive body than said second impurity but a lower segregation coefficient than the latter.

11. A p-n-p transistor as set forth in claim 10 wherein the base region is of n-type material, the emitter region is of p-type material, and a collector region is provided of p-type material.

12. A transistor comprising a semi-conductive body having a pedestal region containing a diffused surface layer of one conductivity type material and serving as a base region, an alloy electrode fused to said body at said diffused layer on said pedestal and forming a recrystallized emitter region and an emitter junction with said base region, said diffused base layer having a depressed portion of predetermined thickness underlying the alloy emitter electrode but contiguous with the remainder of said layer and surrounding said alloy electrode, an ohmic base contact to an exposed portion of said diffused layer spaced from said emitter electrode, an emitter contact to said emitter electrode, and a collector contact to an unaltered portion of said body, said diffused layer containing a first conductivity - determining impurity, said recrystallized emitter region containing said first impurity and also a second impurity producing the opposite conductivity type material and determining the conductivity type of said emitter region, said first impurity possessing a greater diffusion velocity in said semi-conductive body than said second impurity but a lower segregation coefficient than the latter.

13. A transistor as set forth in claim 12, wherein the body has the opposite type of conductivity.

14. A method of manufacturing a semi-conductive body containing two p-n junctions defining a semi-conductive zone of predetermined thickness, comprising fusing and alloying to a semi-conductive body at a region of a first conductivity type a first-conductivity-type impurity-bearing material in the presence of a second-opposite-type-conductivity impurity in contact with the surface of said region and under conditions at which the second impurity simultaneously diffuses into the body via the liquid-solid interface of the fusing material and body to form the zone of predetermined thickness with the opposite type of conductivity and thus one junction with the region of the first conductivity type and said second impurity also diffuses into the surface of the said region to form a surface-diffused layer with the opposite type of conductivity integral with the said zone of predetermined thickness, cooling the body and impurity-bearing material to form a recrystallized zone of a conductivity type determined by the first impurity and forming a second p-n junction with the zone of predetermined thickness, said second impurity possessing a higher diffusion velocity in the semi-conductive body than the first impurity but a lower segregation coefficient than the latter, and making connections to the recrystallized zone, the surface-diffused layer and the said region.

15. A method of manufacturing a semi-conductive body containing two p-n junctions defining a semi-conductive zone of predetermined thickness, comprising surface diffusing into said body at a region of a first conductivity type a second-opposite-conductivity-type-producing impurity to form a diffused surface layer of said opposite type, fusing and alloying at said diffused surface layer an impurity-bearing material containing both first and second conductivity-type-forming impurities under conditions at which a liquid-solid interface of the fusing material and body is established below the level of the diffused surface layer and the second impurity simultaneously diffuses into the body via said interface to form the zone of predetermined thickness with the opposite type of conductivity and integral with the diffused surface layer and thus one junction with the region of the first conductivity type, cooling the body and impurity-bearing material to form a recrysallized zone of a conductivity type determined by the first impurity and forming a second p-n junction with the zone of predetermined thickness, said first impurity possessing a lower diffusion velocity in the semi-conductive body than the second impurity but a higher segregation coefficient than the latter, and making contacts to the surface-diffused layer, the recrystallized zone and the said region of the first conductivity type.

16. In the process of making a transistor, the steps of preparing a blank from a crystal doped with an impurity in growing to give it a predetermined carrier characteristic, diffusing into an outer portion of the blank a doping impurity of an opposite carrier characteristic from the carrier characteristic of the impurity in the blank to provide a base element, fusing to the blank at the outer portion comprising the base element a member carrying doping impurities of two different carrier characteristics, the member penetrating through the outer portion, the doping impurities carried by the member having different diffusion rates, the doping impurity having the higher diffusion rate being of the same carrier characteristic as the impurity in the base element, the proportions of the two doping impurities in the member being such that the slower diffusing will predominate in the mixture, and diffusing into the blank the doping impurities carried by the member fused to the blank, the doping impurities having the higher rate of diffusion and the same carrier characteristics as the doping impurity in the base element penetrating further into the blank than the impurity having the lower diffusion rate and providing an extension of the base element, the impurity having the lower diffusion rate dominating the zone from which the impurity having the higher diffusion rate is diffused providing an emitter element, thereby providing a structure in which the carrier characteristics of the elements alternate.

17. In the process of making a transistor, the steps of preparing a blank from a crystal doped with an impurity in growing to give it a predetermined carrier characteristic, diffusing into an outer portion of the blank a doping impurity of an opposite carrier characteristic from the carrier characteristic of the impurity in the blank to provide a base element, fusing to the blank at the outer portion comprising the base element a member carrying doping impurities of two different carrier characteristics, the member penetrating through the outer portion, the doping impurities carried by the member having different diffusion rates, the doping impurity having the higher diffusion rate being of the same carrier characteristic as the doping impurity in the base element, and diffusing into the blank the doping impurities carried by the member fused to the blank, the doping impurity having the higher rate of diffusion and the same carrier characteristic as the doping impurity in the base element penetrating further into the blank than the impurity having the lower diffusion rate and providing an extension of the base element, the impurity having the lower diffusion rate dominating the zone from which the impurity having the higher diffusion rate is diffused providing an emitter element, fusing to the blank a member carrying a doping impurity corresponding to the doping impurity in the blank, the fusing step causing a pentration into the blank and in conjunction with the blank providing a collector element having the carrier characteristic of the blank, thereby providing a three element structure in which the carrier characteristics alternate.

18. In the process of making a transistor, the steps of preparing a blank from a crystal doped with an n-type doping impurity, diffusing into the surface portion of the blank a p-type doping impurity, fusing at the p-type surface portion of the blank a member carrying doping impurities of the n-type and p-type, the member penetrating through the outer portion, the n-type and p-type doping impurities carried by the member having different diffusion rates, the doping impurity of p-type having a higher diffusion rate, and diffusing into the blank the impurities carried by the member fused to the blank, the p-type doping impurity penetrating further into the blank than the n-type doping impurity and in conjunction with the surface portion carrying the p-type doping impurity providing a base element, the zone from which the doping impurities are diffused being dominated by the n-type doping impurity providing an emitter.

19. In the process of making a transistor, the steps of, preparing a blank from a crystal doped with an n-type doping impurity, diffusing into the surface portion of a blank a p-type doping impurity, fusing at the p-type surface portion of the blank a member carrying doping impurities of the n-type and p-type, the member penetrating through the outer portion, the n-type and p-type doping impurities carried by the member having different diffusion rates, the doping impurity of p-type having a higher diffusion rate, and diffusing into the blank the impurities carried by the member fused to the blank, the p-type doping impurity penetrating further into the blank than the n-type doping impurity and in conjunction with the surface portion carrying a p-type doping impurity providing a base element, the zone from which the doping impurities are diffused being dominated by the n-type doping impurity having the slower diffusion rate and becoming an emitter, and fusing an element carrying n-type doping impurity to the blank, the fusing step causing the n-type doping impurity to pentrate the surface portion of the blank doped by diffusion and in conjunction with the portion of the blank carrying an n-type doping impurity providing a collector element, thereby providing an npn structure.

20. In the process of making a transistor, the steps of, preparing a blank from a crystal doped with a p-type doping impurity, diffusing into a surface portion of the blank an n-type doping impurity, fusing into the n-type surface portion of the blank a member carrying n-type and p-type doping impurities, the member penetrating through the outer portion, the n-type and p-type doping impurities having different diffusion rates, the n-type doping impurity having the higher diffusion rate, diffusing the n-type and p-type impurities carried by the member into the blank, the n-type doping impurities penetrating further into the blank than the p-type doping impurity and in conjunction with the surface portion of the blank carrying n-type doping impurity providing a base element, the zone from which the doping impurities are diffused being dominated by the p-type doping impurity having the slower diffusion rate and becoming an emitter.

21. In the process of making a transistor, the steps of, preparing a blank from a crystal doped with a p-type doping impurity, diffusing into a surface portion of the blank an n-type doping impurity, fusing into the n-type surface portion of the blank a member carrying n-type and p-type doping impurities, the member penetrating through the outer portion, the n-type and p-type doping impurities having different diffusion rates, the n-type doping impurity having the higher diffusion rate, diffusing the n-type and p-type impurities carried by the member into the blank, the n-type doping impurities penetrating further into the blank than the p-type doping impurity and in conjunction with the surface portion of the blank carrying n-type doping impurity providing a base element, the zone from which the doping impurities are diffused being dominated by the p-type doping impurity having the slower diffusion rate and becoming an emitter, and fusing a member carrying a p-type doping impurity to the blank, the p-type doping impurity penetrating the portion of the blank into which an n-type doping impurity was diffused and in conjunction with the part of the blank in which a p-type doping impurity is dominant providing a collector.

22. In the process of making a transistor, the steps of preparing a blank from a crystal doped in growing to give it a predetermined carrier characteristic, diffusing into an outer portion of the blank doping impurities of the opposite carrier characteristic from the carrier characteristic of the impurities in the blank, fusing into the outer portion of the blank so doped a member carrying doping impurities of two different carrier characteristics, the member penetrating through the outer portion, the doping impurities carried by the member having different diffusion rates, the doping impurity having the higher diffusion rate being of the same carrier characteristic as the doping impurities diffused into the outer portion of the blank, diffusing the doping impurities carried by the member fused to the blank further into the blank and controlling the time of diffusion to provide zones of predetermined depths in which doping impurities of opposite carrier characteristics are dominant, the zone dominated by the doping impurity having the same carrier characteristic as the doping impurity introduced into the outer portion of the blank by diffusion connecting with the outer portion of the blank doped by diffusion, thereby forming a three element structure in which the carrier doping characteristics alternate.

23. In a transistor, in combination, a blank in which a doping material having a predetermined carrier characteristic is dominant, a surface zone of predetermined thickness of the blank doped with an impurity having the opposite carrier characteristic from the doping impurity carried by the blank, an alloy member comprising both kinds of doping impurities fused to the blank, the member penetrating through the thickness of the surface zone, a first zone adjacent the member, the first zone being dominated by a doping impurity having opposite characteristics from the doping impurity in the surface zone and constituting an emitter, a second zone next to and extending beyond the first zone and dominated by a doping impurity of opposite characteristic to the doping characteristic in the first zone and connected to the surface zone forming a base, both zones being doped by controlled diffusion of the two impurities in the member and therefore of predetermined thickness, and a collector terminal carrying a doping impurity of the same carrier characteristic as the doping impurity introduced into the blank, the collector terminal being fused to the blank and connecting with the portion of the blank dominated by the doping impurity in the body of the blank as prepared.

24. In a transistor, in combination, a blank carrying a preponderance of p-type doping impurity, a surface zone of predetermined thickness of the blank in which n-type doping impurity is dominant, a member comprising both n- and p-type impurities fused to the blank and penetrating through the surface zone, a first zone in the blank adjacent the member dominated by p-type doping material providing an emitter, a second zone next to and extending beyond the first zone in which n-type doping impurity is dominant, the second zone in conjunction with the doped surface zone constituting a base, both zones being of predetermined dimensions, and a collector terminal fused to the blank, a zone adjacent the collector terminal in which a p-type impurity is dominant, the zone in which the p-type impurity is dominant extending through the surface zone and connected to the body of the blank dominated by p-type impurity forming a collector.

25. The process of making a transistor comprising, a first step of heating a semiconductor body of an original conductivity-type in contact with a material comprising a carrier, capable of forming an alloy with said semiconductor body at a temperature below the melting temperature of said body, and selected quantities of an original and an opposite conductivity-type directing impurity, said opposite conductivity-type directing impurity having a diffusion co-efficient greater than the diffusion coefficient of said original conductivity-type directing impurity, said original conductivity-type directing impurity having a segregaton co-efficient greater than the segregation co-efficient of said opposite conductivity-type directing impurity, said heating step being performed at a temperature above that at which said carrier is molten and below the melting temperature of said body, said quantities of said original and said opposite conductivity-type directing impurities being so selected and said heating step being continued at said temperature for such a time that only said opposite conductivity-type directing impurity diffuses significantly into said body to a predetermined depth thereby forming by said diffusion only a single region in said body, which region is of opposite conductivity-type to said body; and a second step of cooling said body thereby forming by segregation a recrystallized region of said original conductivity-type in said body and applying an ohmic contact to each of said original conductivity-type portion of said body and said recrystallized region.

26. The process of making a transistor comprising the steps of first, forming by diffusion a surface of opposite conductivity-type on an original conductivity-type semiconductor body; second, heating said body in contact with, on said surface, a quantity of material comprising a carrier, capable of forming an alloy with said body at a temperature less than the melting temperature of said body, and a quantity of an original conductivity-type directing impurity and a quantity of an opposite conductivity-type directing impurity, the diffusion co-efficient of said opposite conductivity-type directing impurity being greater than the diffusion co-efficient of said original conductivity-type directing impurity and the segregation co-efficient of said original conductivity-type directing impurity being greater than the segregation co-efficient of said opposite conductivity-type directing impurity, said heating step being carried out at a temperature greater than the melting temperature of said carrier and less than the melting temperature of said body whereby a molten alloy is formed on said body, said quantities of said original and said opposite conductivity-type directing impurities being so selected and said heating step being continued at said temperature for such a time that only said opposite conductivity-type directing impurity diffuses significantly from said molten alloy into said body so as to form by said diffusion only a single region in said body which region is of opposite conductivity-type to said body; and third, cooling said body forming thereby a recrystallized region of said original conductivity-type and applying ohmic contacts to each of said original conductivity-type portion of said body, said opposite conductivity-type surface, and said re-crystallized region.

27. The process of making a transistor comprising the steps, of first, forming by diffusion a zone of opposite conductivity-type in an original conductivity-type body; second, heating said body in contact with a quantity of material comprising a carrier, capable of forming an alloy with said body at a temperature less than the melting temperature of said body, and a quantity of an original conductivity-type directing impurity and a quantity of an opposite conductivity-type directing impurity, the diffusion co-efficient of said opposite conductivity-type directing impurity being greater than the diffusion co-efficient of said original conductivity-type directing impurity and the segregation co-efficient of said original conductivity-type directing impurity being greater than the segregation co-efficient of said opposite conductivity-type directing impurity, said heating step being carried out at a temperature greater than the melting temperature of said carrier and less than the melting temperature of said body whereby a molten alloy is formed on said body, said quantities of said original and said opposite conductivity-type directing impurities being so selected and said heating step being continued at said temperature for such a time that only said opposite conductivity-type directing impurity diffuses significantly so as to produce by said diffusion only a single region in said body, which region is of opposite conductivity-type to said body, thereby forming an extension of said opposite conductivity zone; third, cooling said body forming thereby a re-crystallized region of said original conductivity-type and applying ohmic contacts to each of said original conductivity-type portion of said body, said opposite conductivity-type zone, and said re-crystallized region.

References Cited

UNITED STATES PATENTS

| | | | |
|---|---|---|---|
| 2,802,760 | 8/1957 | Derick et al. | 148—1.5 |
| 2,805,370 | 9/1957 | Nilson | 148—1.5 XR |
| 2,829,422 | 4/1958 | Fuller | 317—235 |
| 2,836,521 | 5/1958 | Longini | 148—1.5 |

FOREIGN PATENTS

| | | |
|---|---|---|
| 1,113,385 | 12/1955 | France. |

CHARLES N. LOVELL, Primary Examiner

U.S. Cl. X.R.

148—33.5, 178